United States Patent [19]

Connell

[11] Patent Number: 4,780,816
[45] Date of Patent: Oct. 25, 1988

[54] KEY-TO-ADDRESS TRANSFORMATIONS

[75] Inventor: John B. Connell, Kirkwood, Mo.

[73] Assignee: The United States of America as represented by the Secretary of the Army, Washington, D.C.

[21] Appl. No.: 864,625

[22] Filed: May 16, 1986

[51] Int. Cl.⁴ .............................................. G06F 7/00
[52] U.S. Cl. .................................................. 364/200
[58] Field of Search .... 364/200 MS File, 90 MS File

[56] References Cited

U.S. PATENT DOCUMENTS

| 3,681,781 | 8/1972 | Batcher | 364/300 |
|---|---|---|---|
| 3,902,163 | 8/1975 | Amdall et al. | 364/200 |
| 4,215,402 | 7/1980 | Mitchell | 364/200 |
| 4,249,241 | 2/1981 | Aberle et al. | 364/200 |
| 4,277,826 | 7/1981 | Collins et al. | 364/200 |
| 4,290,105 | 9/1981 | Cichelli et al. | 364/200 |
| 4,314,356 | 2/1982 | Scarbrough | 364/900 |
| 4,418,275 | 11/1983 | Oosterbaan et al. | 364/200 |

OTHER PUBLICATIONS

Lum et al., "Key-To-Address Transform Techniques: A Fundamental Study on Large Existing Formatted Files", *Communications of the ACM*, vol. 14, #4, pp. 228-239, Apr. 1971.

Knott, "Hashing Functions", *The Computer Journal*, vol. 18, No. 3, pp. 265-277, 1975.

Chen et al., "Analysis of New Variants of Coalesced Hashing", *ACM Trans. on Database Systems*, vol. 9, No. 4, pp. 616-645, Dec. 1984.

*Primary Examiner*—Gary V. Harkcom
*Assistant Examiner*—Dale M. Shaw
*Attorney, Agent, or Firm*—Norman L. Wilson, Jr.

[57] ABSTRACT

Storage or retrieval of a record from computer storage or memory is generally accomplished by scanning, or direct addressing. Scanning a file of records to retrieve one particular record requires comparing its key with the key of one record after another until a match is found. Direct addressing involves assigning each record to a specific location usually on the basis of a record key. Direct addressing provides the most rapid means of accessing a single record in a file, but the process of transforming a record key, to a corresponding address or location where the record can be found, is subject to certain disadvantages. Neither complete randomization nor a completely uniform distribution results when keys are converted to addresses even by random conversion transformations or hashing techniques. A transformation or hashing process is provided herein which not only leads to a greater degree of randomness, but is so general that it is effective for both static and volatile files.

8 Claims, 2 Drawing Sheets

HASH TABLE.

| 01 | 4F | 0C | 7C | DD | F7 | E5 | 5D | 76 | C9 | 1B | 77 | F4 | 78 | C3 | 69 |
|---|---|---|---|---|---|---|---|---|---|---|---|---|---|---|---|
| 9A | 6C | 10 | B7 | 7B | F9 | EA | 74 | 81 | E7 | BA | 8E | C7 | 92 | EB | 50 |
| 5C | 57 | 39 | D1 | 25 | E4 | 24 | 6D | 48 | 2C | 06 | 44 | 2E | 56 | E3 | DA |
| 0D | 18 | 7F | 3C | 3A | AC | 38 | A8 | 35 | 2A | 1D | AF | B2 | D0 | 19 | CD |
| 37 | 9B | F5 | 0A | 89 | BE | 47 | 0F | 32 | D6 | 2D | D8 | BF | 11 | 1A | 94 |
| 3D | 15 | F2 | 05 | 97 | 91 | C5 | DC | E6 | E8 | BB | FE | 41 | C8 | AA | 03 |
| 31 | CF | B3 | 02 | 66 | 17 | 07 | D5 | 82 | 3B | 1F | B9 | 5F | 8B | DE | 49 |
| C0 | E2 | BC | A2 | 5B | B6 | 1C | 22 | AD | 09 | D3 | 5A | 21 | 04 | B8 | C6 |
| A3 | 72 | 4B | C4 | F8 | 46 | 8F | 29 | 65 | 61 | 4D | 84 | 62 | 27 | 3E | F0 |
| AB | DB | 63 | 2B | D4 | 8A | 8D | 9D | CC | 33 | F6 | B1 | 9E | 42 | C2 | 87 |
| EC | 4C | B0 | F3 | 53 | D9 | FD | 30 | 12 | 0B | 1E | 80 | 36 | 54 | 23 | 14 |
| FA | 08 | 3F | 98 | E9 | 86 | 45 | B5 | 2F | 9C | 00 | C1 | 16 | 93 | 7A | 28 |
| 13 | BD | ED | A1 | F1 | 8C | 64 | 52 | 60 | 55 | 20 | D2 | 6E | 70 | 95 | 0E |
| E0 | EF | CA | A5 | A7 | 59 | 4A | 6F | 79 | 96 | 4E | 58 | 71 | 5E | B4 | FC |
| 85 | A6 | 75 | 7D | D7 | 40 | E1 | 73 | A4 | 34 | 26 | 88 | 67 | 6A | FF | DF |
| 83 | 51 | 68 | 7E | 90 | CE | 43 | FB | 99 | CB | A9 | A0 | 9F | 6B | AE | EE |
| 01 | 4F | 0C | | | | | | | | | | | | | |

FIG. I.

KEY-TO-ADDRESS TRANSFORMATIONS

RELATED APPLICATIONS

This application repeats substantial portions of two earlier applications, now abandoned, and contains matter not disclosed in those earlier applications, Ser. No. 146,580, filed May 5, 1980 and Ser. No. 485,771 filed Apr. 18, 1983, both now abandoned.

FIELD OF INVENTION

This invention relates to information storage and retrieval. More particularly it pertains to key-to-address transformations or hashing procedures. An object of the invention is to produce a set of statistically randomly distributed storage addresses.

BACKGROUND OF THE INVENTION

As set forth in U.S. Pat. No. 4,358,824 state of the art document storage and retrieval is based on manually selecting keywords to represent a document in the system's catalog or index and then effecting retrieval by recalling from memory appropriate keyword terms and either automatically or manually searching the index for an "appropriate" level of match against the prestored keywords. Procedures have been developed in the prior art of abstracting documents and retrieving them based on keyword matching. Each document or record has a unique identifier or key. Scanning a file or records to retrieve one particular document or record requires comparing its keyword or key with the key to one record after another. When a key match is obtained the record can be retrieved. This type of search required a careful organization of the records.

Direct addressing involves assigning each record to a specific location which is large enough to contain one or more records and which can be thought of as a bin or bucket. Since this operation usually requires much less time than a scan or other type of search, direct addressing is preferred as the most rapid means of accessing a single record in a file.

While being preferred, the process of transforming a document keyword or record key, to a corresponding main or external memory storage address, thought of as the bin or bucket location where the record can be found, is subject to certain disadvantages. Clusters and gaps frequently occur due to the manner addresses are assigned. Accordingly the memory, or bin address is frequently derived by means of a key conversion or transformation to randomize the address. This key-to-address transformation is intended to disperse the clusters, making the distribution of storage addresses more nearly uniform, and hence is known as hashing or randomizing. Thus, ideally, a key-transformation-technique should yield a unique address for each document or record and 100 percent utilization of the allocated memory storage space. The distribution should be uniform, and all the storage spaces should be filled.

Unfortunately neither complete randomization nor a completely uniform distribution results when keys are converted to addresses by the usual random conversion transformations or hashing techniques. Rather, known key-to-address transformations attempt, with limited success, to produce addresses intermediate between random and uniform. The results are often unpredictable and frequently result in undesirable overflows. That is, the assignment of more records to a location or bin than it can hold.

The storage and retrieval of information is the subject of various patents such as U.S. Pat. Nos. 3,350,695, 3,614,744, 3,681,781, 3,702,010 and 4,079,447. However, of these, only 3,681,781 pertains to hash addressing or hashing. That invention is not directed to the distribution of addresses, but to techniques for hashing which allow information to be found from approximate key values. For more specific descriptions of hashing techniques such articles as "Key-to-Address Transform Techniques: A Fundamental Performance Study on Large Existing Formatted Files", V. Y. Lum et al, *Communications of the ACM*, April 1971, and "Hashing Functions", G. D. Knott, *The Computer Journal*, Vol. 18, No. 3, 1975 are noted. *The Art of Computer Programming*, Vol. 3: *Searching and Sorting*, D. E. Knuth, 1973, Addison-Wesley also contains pertinent material. As described in these sources various key-to-address transformations have been developed in the form of conversions which randomize the addresses. Since the object of such transformations is statistical, the terms randomization, and hashing have become associated with them.

Obviously, no single transformation method can satisfy all of the speed, uniformity and simplicity requirements. A great deal of effort, with some remarkable results, has been expended in developing transformations producing a high degree of uniformity in the distribution of records throughout their storage space. However, in many cases the conversion method was tailored to the characters, range and length of the keys. Therefore, such methods lack generality. In accordance with the practice of this invention a transformation or hashing process is provided which not only leads to a greater degree of randomness than those heretofore known, but which does not lack generality. It is effective for both static and volatile files, and it works well with all types, ranges, and lenghts of keys. The procedure need not be modified for keys with irregular lenghts, regular or irregular separations, and different sets of characters. Hence this transformation method can be used for all files and different sets of keys at one or many data processing installations. In effect it takes whatever order may or may not exist in the keys and produces a state of chaos or randomization. The numbers or records which will be assigned to memory locations or bins can be calculated before the transformation procedure is actually used. Thus file space can be properly allocated, overflow problems minimized, and other file utilization characteristics can be optimized.

SUMMARY OF THE INVENTION

A method is provided herein for storing and retrieving documents wherein storage locations for them are based on record keys. The crux of the method is the formation of an arrangement of characters by randomly selecting characters of a number system and forming the arrangement so that each character is unique, and has a distinct position in the arrangement. The arrangement is in the form of an array of randomly positioned characters. To randomize the storage location, each letter of the record key is first converted to a number using its unique numerical equivalent in that number system. That numerical equivalent, or number, leads to a location in the number arrangement and a stored character in the array. The numeral stored in the array at that location is used to find yet another location in the arrangement and another character, leading to still another array location. The degree of randomness increases as the number of translations increases, leading to a randomized numeral for each original record key character. Using the numerical equivalents of the stored characters so located, each record key character is similarly serially repetitively translated.

Having obtained a random number for each record key character, a composite number for each character is then obtained. This is accomplished by concatenating the finally derived numeral with adjacent numerals in the character array so that one composite number is derived from each of the original characters of the record key. All of the composite numbers thus obtained are then combined into a single number through such known operations as mathematical and Boolean calculations. The single number thus obtained is scaled, if necessary, to form an ultimate number not exceeding the total number of available memory locations. Since the ultimate number thus derived is an address, the document is stored and retrieved using this random storage address.

DETAILED DESCRIPTION OF THE INVENTION

There is no unique, and simple, method for transforming keys to storage addresses. All of the methods described in the articles referred to are available. Indeed it will be apparent that some of those methods can be used as steps in this invention. The invention herein is predicated on the obtainment of nearly random distribution of storage addresses. The steps involved are not new calculations, formulas or equations. Rather, a randomly developed number array is employed in which positions must be located physically or by a computer. The array is independent of a computer, and the well-known methematical operations involved are employed subsequent to its use. Using this array several of randomizing document key translations are made by going from position to position in the array. This will be better understood from the following specific example described in conjunction with the accompanying drawings.

In the drawings,

FIG. 1 is a numerical array.

Figure 2:
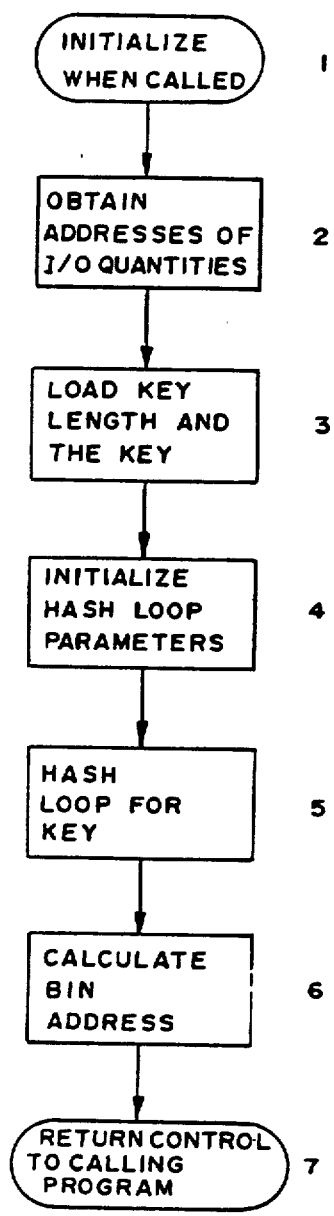
FIG. 2 is a flow chart of the overall procedure.

As indicated, the invention herein is based, primarily, upon the use of a randomly constructed arrangement of characters. Ideally, the number system chosen will be that containing a number of characters, exceeding the number in the record or document key. Although the invention is not a computer program, its greatest application will be in the area of computers, that is, for randomizing computer memory storage locations. Considering computer applications, then, it is desirable that the number of characters in the array be correlated with the highest number of bits stored in a byte. Considering that computers are binary machines this number will be a power of 2. Thus in a four bit byte computer the number of bits stored in a byte will be $2^4$ or 16. The preferred numeration system, again considering a binary system, will be a numeration system with a radix of 4 since $4^2$ is 16. In the case of an eight bit byte computer, the number of bits stored will be $2^8$ or 256. Since this is $16^2$ the preferred numeration system will have a radix of 16, i.e., the hexadecimal system. The hexadecimal system was preferred by IBM because it contains 256 single digit unique characters. For the purpose of illustration the 256 characters of the hexadecimal system have been used in making up the array shown in FIG. 1. This record key character array, shown in FIG. 1, performs two functions in the invention. As will be shown later, it can also serve a third function. First the number array contains the characters of a number system such as the decimal, hexadecimal and duodecimal systems as explained. In addition, it is a "closed" table. Every entry must be distinct and must have a value equal to an address in the table itself. In a simple case of a table with ten entries, the addresses would range from 0 to 9 and the entries would also have the same set of values, 0 to 9. The addresses, by their nature, exist in sequential order but the entries are selected at random. Since each key character has a unique table entry, or array address, the array can be used for translating the characters of the record key or keyword employed, i.e., the document identifier. This is the first function of the array. Additionally, since every entry can also be considered to be an address, repeated translations may be performed. Following the translations, a logic operator can be used on the table entries, yielding a new table address. By "logic operator" I include any of the arithmetic or Boolean operations employed in methematical logic.

The results of some of the possible operations may give addresses outside the range of the table. When this occurs, the result is scaled or truncated in order to fall within the permissible range of addresses. Since the table entries are in random sequence, each use of the table to perform a translation function introduces an additional random attribute to the result.

Referring specifically to FIG. 1, a randomly formulated array is shown for the purpose of illustration. The table was constructed by pulling 256 hexadecimal values from a container and then listing them in the order in which they were drawn. As indicated the entries in the table have values which depend upon a computer, if one is used. In this instance a hexadecimal (hex) notation, of 00 to FF, corresponding to 0 to 255 table addresses is preferred. Each pair of hexadecimal numbers thus constitutes a computer "byte" in the range from 00 to FF (or in decimal from 0 to 255). It is to be understood that there are many ways in which such an arrangement or array can be generated using a predefined set of n key characters.

It can be seen that each pair of characters (letter or number) in FIG. 1 corresponds to a number in the range from 0 to 255. Since 256 will generally be much greater than the number of characters in the record key, this particular table is both flexible and comprehensive. It can be used with several computer codes, for instance both EBCDIC (Extended Binary—Coded—Decimal Interchange Code) and USASCII (US Standard Code for Information Interchange) codes.

As an example, consider the record key X6. In the EBCDIC code the letter X is decimal 231. EBCDIC character 6 in decimal notation is 246. As indicated the key-to-address transformation procedure of the invention uses the table for two purposes. The first and most important is the use of the table in translation operations. One or more characters of the record key are considered to be addresses in the table for an initial translation. For example the address of the letter X (EBCDIC) is considered to be 231. Counting 231 squares in the table of FIG. 1, starting with zero leads to hex 73 (found in the 232nd square starting with 1). Similarly using the EBCDIC character 6, which is decimal 246, and starting with 0 and counting to 246, one finds hex 43 in the table. The array in FIG. 1 has thus been used for an initial translation of each record key character. Such translations can be repeated any desired number of times, and they can be performed in any desired order of key characters. For example hex 73, obtained as described, is decimal number 115, starting with 0 and counting 115 positions in the array of FIG. 1 yields A2. Similarly hex 43 is decimal 67. This leads to 0A, which is in the 67th position in the table in FIG. 1, starting with zero.

After a character has been translated it is combined, by means of the appropriate logic operator, the mathematical logic arithmetic and/or Boolean operation, with other key characters or table entries, for example key character 6, described hereinbefore, to give a new table address. Preferably the number of translations and logic operations is equal to the left-to right position number of the character in the key. The Boolean EXCLUSIVE OR operation is a desirable logic operator. It is used to combine two quantities on a "bit" basis. A bit position in the result is set equal to one if the corresponding bit positions in the two quantities are unlike; otherwise, the resulting bit is set equal to zero. The hex 73 previously extracted from the table can be EXCLUSIVE OR'ed with the hex value of F6, the representation of a key character 6. The result of the operation is, then, hex 85 (decimal 133). This, if desired, can be treated as an address in the table, and used as the basis for a subsequent translation. If such is the case this portion of the procedure is incorporated in a hash loop set up to effect translations of, and operations on, all the characters of the key. The hash looping can be repeated as deemed necessary. Each time the table is used a random attribute is introduced into the result. Randomization is at least partially determined by the number of iterations specified for the hash loop. Desirably therefore the looping is repeated until all the characters of the key have been treated. This normally yields a sufficiently randomized result. If a greater degree of randomization is desired because of duplicate results or other reasons the iterations can be repeated by further looping. Generally more than ten iterations beyond the number of characters of the key are unnecessary. Thus by this step the key characters are replaced by a set of numbers within the same numerical range as the table addresses. In order to effect this randomization each designated position in the table must be physically located.

The next step in the procedure is to convert this set of numbers or random bytes to one random number. Ideally this number will be uniquely associated with the key from which the random bytes are obtained. The range of values for these numbers will be based on convenient machine capabilities, such as the "word" size of the computer. A computer word is a larger storage unit than a byte. It is usually a multiple of a byte, and in many machines four sequential bytes constitute a word. The word can also be used as a basis for arithmetic, logical operations. Since the word value can be scaled down to a value in the range of the anticipated number of bin or bucket locations in main memory or external storage, the word can be virtually any single random number. This single random number, or computer word with a randomly distributed numerical value, is thus obtained from a set of randomly selected words. In the example table of FIG. 1 the random bytes associated with the key characters can take on 256 values. These values can then be used to generate, i.e., select, a set of random words. The random words are then combined by means of Boolean and/or arithmetic logic operations to yield the single desired number or word which has been transformed from the key.

As noted hereinbefore there is an additional use for the random array. It can be the source of the random words required in this third step of the procedure of the invention. Thus, each random byte in the set obtained from the key can be used as an address in the table. The byte at that address, and the next three bytes constitute a four byte word. The four byte word will have random characteristics because of the manner in which the array was constructed. Using this method one such word will be extracted from the table for each random byte of the converted key. Their final combination by the use of the logic operator is the ultimate hashed value for the key.

The distribution of bytes and words in the table or array and the nature of the procedure do not completely preclude the possibility that more than one key will be transformed to the same result. But such an occurrence is consistent with the purpose of achieving a random distribution. In most cases, however, the ranges of values and the types of operations can be selected in a way that minimizes such duplicates.

The final step of my method is that of scaling the single random number, or word, obtained from a key, to a relative address, that is, the sequential identification of the address of a bin or bucket. This number cannot exceed the number of bins to be used to store the records. For example if there are ten bins the random number would be scaled to the range of 0 to 9. It has been stated that randomizing methods of the prior art can be used as steps in this invention. It will be understood that in scaling down the single random number any of the methods available from other sources, such as the ones discussed in the Knuth text can be employed.

Figure 3:
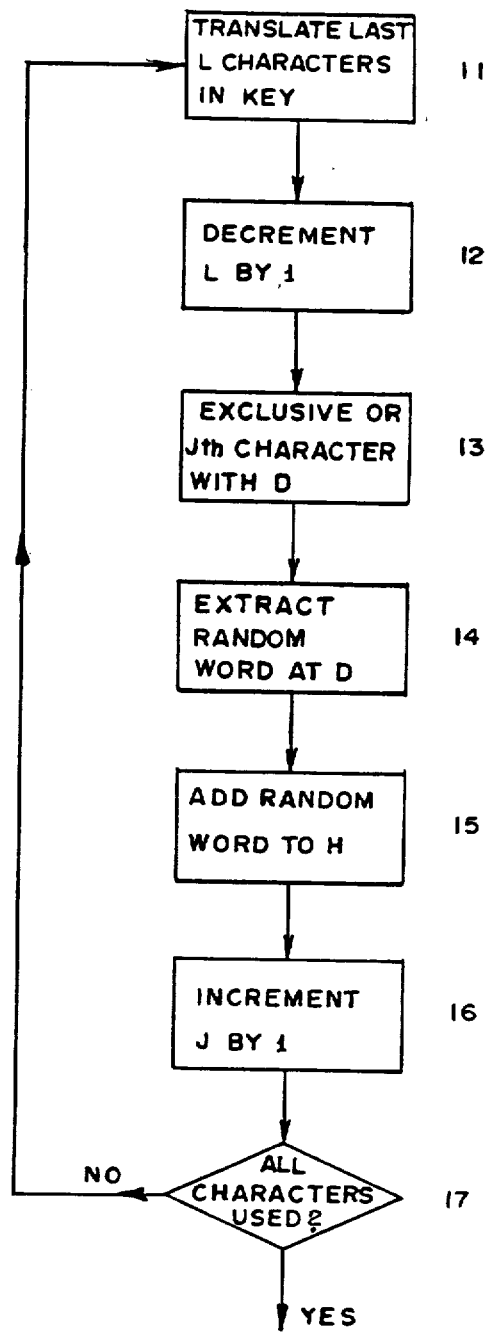
FIG. 3 is a flow chart of the hash loop to be described.

Use of the invention in a non-computer environment has been described. Since it will be especially useful in the computer field that aspect will now be described in conjunction with FIGS. 2 and 3 of the drawing. FIG. 2 is a flow chart showing a one overall realization of the procedure. FIG. 3 is a more detailed flow chart showing the randomizing or hash loop, which is Block 5 of FIG. 2. These are flow charts of the program module listing which follows. It is to be understood that whereas the use of the invention for storing and retrieving documents by computer is now being illustrated, the foregoing description of the invention shows that an algorithm is not preempted. An array such as the one shown in FIG. 1 is still the most important feature of the invention, and it is separate from any algorithm. In fact, referring to lines 14000 thru 15700 it can be seen that the number array of FIG. 1 is incorporated as data. Referring to this particular illustrative program, as can be seen, it is written in assembler language specifically for an IBM System/360.

| TITLE 'HASHING MODULE' | 00000100 |
|---|---|
| | 00000200 |
| | 00000300 |

```
                THE HASHING MODULE IS CALLED BY ANOTHER PROGRAM.                     00000400
                IT TRANSFORMS A RECORD KEY TO PRODUCE A RELATIVE                     00000500
                BIN OR BUCKET ADDRESS (OR LOCATION) WHICH IS                         00000600
                SUBSEQUENTLY CONVERTED TO A MAIN MEMORY OR                           00000700
                SECONDARY STORAGE ADDRESS BY THE CALLING PROGRAM.                    00000800
                                                                                     00000900
                THIS PARTICULAR HASHING PROCEDURE FIRST CONVERTS                     0000100
                THE KEY TO A FULL-WORD HASHED VALUE AND THEN                         00001100
                USES A MULTIPLICATIVE TECHNIQUE ON THE WORD TO                       00001200
                ARRIVE AT A RELATIVE BIN NUMBER WITHIN THE RANGE                     00001300
                OF THE SPECIFIED STORAGE SPACE.                                      00001400
                                                                                     00001500
                AT ENTRY TO HASHING ROUTINE, REG 1 POINTS TO A                       00001600
                PARAMETER LIST CONTAINING THE FOLLOWING 4 PARMS . . .                00001700
                                                                                     00001800
                                                                                     00001900
                                                                                     00002000

ADDR OF KEY                                            00002100
                                                                                     00002200
                                                                                     00002300
                                                                                     00002400

ADDR OF NUMBER OF STORAGE BINS,                        00002500
                              RANGE AVAILABLE FOR RECORDS                            00002600
                                                                                     00002700
                                                                                     00002800
                                                                                     00002900

ADDR OF LENGTH OF KEY                                  00003000
                                                                                     00003100
                                                                                     00003200
                                                                                     00003300

ADDR OF RESULT (RELATIVE BIN ADDR)                     00003400
                                                                                     00003500
                                                                                     00003600
                                                                                     00003700

00003800
                                                                                     00003900
                                                                                     00004000
HASHER    CSECT                                                                      00004100
R0        EQU    0                                                                   00004200
R1        EQU    1                                                                   00004300
R2        EQU    2                                                                   00004400
R3        EQU    3                                                                   00004500
R4        EQU    4                                                                   00004600
R5        EQU    5                                                                   00004700
R6        EQU    6                                                                   00004800
R7        EQU    7                                                                   00004900
R8        EQU    8                                                                   00005000
R9        EQU    9                                                                   00005100
R10       EQU    10                                                                  00005200
R11       EQU    11                                                                  00005300
R12       EQU    12                                                                  00005400
R13       EQU    13                                                                  00005500
R14       EQU    14                                                                  00005600
R15       EQU    15                                                                  00005700
          STM    R14,R12,12(R13)                                                     00005800
*
*
          USING  HASHER,R15                                                          00005900
*                                                                                    00006000
                                                                                     00006100
          LM     R8,R11,0(R1)    LOAD THE FOUR PARMS                                 00006200
*                                R8, ADDR OF KEY                                     00006300
*                                R9, ADDR OF NUMBER OF STORAGE BINS                  00006400
*                                R10, ADDR OF KEY LENGTH                             00006500
*                                R11, ADDR OF RESULT                                 00006600
                                                                                     00006700
          L      R10,0(R10)      LOAD KEY LENGTH                                     00006800
          BCTR   R10,0           R10 CONTAINS KEY LENGTH MINUS 1                     00006900
          EX     R10,MOVE        MOVE KEY TO WORK AREA, STORKEY                      00007000
*                                                                                    00007100
*  INITIALIZE THE HASH LOOP PARAMETERS                                               00007200
*                                                                                    00007300
INITLOOP  EQU    *                                                                   00007400
          LA     R5,STORKEY      INITIALIZES BXLE COUNTER                            00007500
          LA     R6,1            INITALIZES BXLE INCREMENT                           00007600
          LA     R7,0(R10,R5)    INITIALIZES BXLE LIMIT                              00007700
          SR     R3,R3           ZERO HASHED RESULT ACCUMULATOR                      00007800
          SR     R2,R2           ZERO KEY BYTE REGISTER                              00007900
          SR     R12,R12         ZERO RELATIVE TABLE ADDRESS                         00008000
*                                ACCUMULATOR                                         00008100
*                                                                                    00008200
*  HASH THE KEY                                                                      00008300
```

-continued

| | | | | |
|---|---|---|---|---|
| HASHLOOP | EQU | * | | 00008400 00008500 |
| | EX | R10,TRNSLATE | USE RANDOM TABLE TO TRANSLATE THE KEY | 00008600 |
| | BCTR | R10,0 | DECREMENT LENGTH BY 1 | 00008700 |
| | IC | R2,0(,R5) | GET ONE BYTE OF TRANSLATED KEY | 00008800 |
| | XR | R12,R2 | EXCLUSIVE OR WITH PREVIOUS BYTES TO | 00008900 |
| * | | | DETERMINE DISPLACEMENT INTO TABLE | 00009000 |
| | LA | R8,RNDMTBL(R12) | ADDR IN RANDOM TABLE | 00009100 |
| | MVC | RNDMWRD,C(R8) | MOVE RANDOM WORD(4BYTES) TO PROPER | 00009200 |
| * | | | BOUNDRY | 00009300 |
| | AL | R3,RNDMWRD | ADD LOGICAL TO PREVIOUS VALUE. | 00009400 |
| * | | | 32 BIT (CONSIDERED POSITIVE) | 00009500 |
| * | | | VALUES, CARRIES IGNORED | 00009600 |
| | BXLE | R5,R6,HASHLOOP | REPEAT UNTIL KEY IS EXHAUSTED | 00009700 |
| * | | | | 00009800 |
| * | SHIFT RIGHT ONE BIT TO CIRCUMVENT THE INITIAL SIGN BIT CONVENTION, | | | 00009900 |
| * | MAKES ALL HASHED VALUES APPEAR POSITIVE FOR MACHINE ARITHMETIC, | | | 00010000 |
| * | EQUIVALENT TO DIVISION OF 32 BIT (POSITIVE) RESULTS BY TWO | | | 00010100 |
| * | | | | 00010200 |
| CONVERSN | EQU | * | | 00010300 |
| | SRL | R3,1 | | 00010400 |
| * | | | | 00010500 |
| * | USE MULTIPLICATIVE TECHNIQUE TO SCALE RESULT TO YIELD RELATIVE | | | 00010600 |
| * | STORAGE BIN ADDRESS | | | 00010700 |
| * | | | | 00010800 |
| SCALE | EQU | * | | 00010900 |
| | L | R9,0(R9) | LOAD NUMBER OF STORAGE BINS, RANGE | 00011000 |
| | AR | R9,R9 | MULTIPLY IT BY TWO TO COMPENSATE | 00011100 |
| * | | | FOR RIGHT SHIFT OF HASHED VALUE | 00011200 |
| | MR | R2,R9 | MULTIPLY THE (HASHED VALUE)/2 IN | 00011300 |
| | | | REG 3 BY 2*(NO. OF BINS). | 00011400 |
| | | | PRODUCT IS (HASHED VALUE)*(NO. | 00011500 |
| | | | OF BINS). REG 2 NOW CONTAINS | 00011600 |
| | | | THE VALUE OF THE RELATIVE BIN | 00011700 |
| | ST | R2,0(R11) | RETURN VALUE OF RELATIVE BIN TO | 00011800 |
| * | | | CALLING PROGRAM | 00011900 |
| * | | | | 00012000 |
| | DROP | R15 | | 00012100 |
| * | | | | 00012200 |
| | SR | R15,R15 | SET RETURN CODE = 0 ** DESTROYS BASE | 00012300 |
| RETURN | LM | R0,R12,20(R13) | RESTORE REGS 0-12 | 00012400 |
| | L | R14,12(R13) | RESTORE REG 14 | 00012500 |
| | BR | R14 | RETURN | 00012600 |
| * | | | | 00012700 |
| * | BASE REGISTER STATEMENT FOR/AND | | | 00012800 |
| * | EXECUTE STATEMENTS | | | 00012900 |
| * | | | | 00013000 |
| | USING | HASHER,R15 | | 00013100 |
| MOVE | MVC | STORKEY(C),0(R8) | | 00013200 |
| TRNSLATE | TR | 0(0,R5),RNDMTBL | | 00013300 |
| * | | | | 00013400 |
| * | WORK AREAS AND RANDOM TABLE | | | 00013500 |
| * | | | | 00013600 |
| RNDMWRD | DC | F'0' | STORAGE FOR 4 BYTES FROM TABLE | 00013700 |
| | DS | 0D | | 00013800 |
| STORKEY | DC | 256X'0C' | STORAGE AREA FOR KEY | 00013900 |
| | DS | 0D | | 00014000 |
| RNDMTBL | DC | X'014F0C7CDDF7E55D76C91B77F478C369' | | 00014100 |
| | DC | X'9A6C10877BF9EA7481E7BA8EC792EB50' | | 00014200 |
| | DC | X'5C5739D125E4246D482C06442E56E3DA' | | 00014300 |
| | DC | X'0D187F3C3AAC38A8352A1DAFB2D019CD' | | 00014400 |
| | DC | X'379BF5CA898E47CF32D62DD8BF111A94' | | 00014500 |
| | DC | X'3D15F2C59791C5DCE6E888FE41C8AA03' | | 00014600 |
| | DC | X'31CFB302661707D582381FB95F8BDE49' | | 00014700 |
| | DC | X'C0E2BCA25BB61022ADC9D35A2104B8C6' | | 00014800 |
| | DC | X'A3724BC4F8468F2965614D8462273EF0' | | 00014900 |
| | DC | X'ABDB6328D48A8D9DCC33F6B19E42C287' | | 00015000 |
| | DC | X'EC4CB0F35309FD30120B1E8036542314' | | 00015100 |
| | DC | X'FA083F98E98645B52F9C00C116937A28' | | 00015200 |
| | DC | X'138DEDA1F18C64526055 20D26E70950E' | | 00015300 |
| | DC | X'E0EFCAA5A7594A6F79964E58715EB4FC' | | 00015400 |
| | DC | X'85A6757DD740E173A4343688676AFFDF' | | 00015500 |
| | DC | X'8351687E90CE43FB99CBA9A09F6BAEEE' | | 00015600 |
| | DC | X'014FCC' | WRAP AROUND | 00015700 |
| * | | | | 00015800 |
| | LTORG | | | 00015900 |
| | END | HASHER | | 00016000 |

The hashing module, Table I would be called by some other program. The "calling" program provides the hashing program with the addresses (in the main memory of the computer) of the record key, the number of storage bins specified for the file records, and the length of the key. The calling program also provides a main memory address where the relative bin address is to be stored after the transformation of the key has been completed. After the key-to-address transformation is made by means of the hashing module and the result returned to the calling program, the relative bin address is adapted and converted to a main memory or secondary storage address by the calling program. The calling program then uses this address to read, store, or update a record.

Referring now to the hashing module, lines 5800 and 6000 of this program correspond to Block 1 of FIG. 2. These instructions are standard initialization procedures for "calling" and "called" programs. The instructions in lines 6200 thru 7000 obtain the desired addresses and move the key and its length to the hashing program area (Blocks 2 and 3 FIG. 2).

The operations in Blocks 4 and 5 can be explained in terms of algebraic symbols. The quantity L is set equal to the length of the key. D represents a displacement into the random byte table, that is, a relative address in the table. H represents the combination of the random words extracted from the byte table and J is an index which identifies the character of the key being operated on during each of the iterations of the hash loop. Initially D, H and J are set equal to zero. When $J=0, 1, 2, \ldots$ the 1st, 2nd, 3rd, $\ldots$ characters are operated on during the 1st, 2nd, 3rd, $\ldots$ repetitions of the loop operations. The instructions on lines 7500 to 8000 of the program (Table I) set up the initial values for these quantities (Block 4) and for the hash loop of Block 5. The hash loop is shown more minutely in FIG. 3. The figure is a detailed diagram of Block 5 in FIG. 2.

In this embodiment of the invention most of the functions of the procedure are performed in the hash loop. The order in which they are preformed is mixed. The characters of the key are operated on both sequentially and simultaneously each time that the instructions of the loop are executed. That is, the various translations, the Boolean and/or arithmetic logic steps or operations, and the selection and combinations of the random words are all preformed for a character of the key everytime the instructions of the loop are executed.

The first instruction in the loop, line 8600 of the program (Block 11 of FIG. 3), uses the random byte table (lines 14100 to 15700) to translate the last L characters of the key. The instruction on line 8700 reduces the value of L by one (Block 12). The instructions on lines 8800 and 8900 select the Jth byte from the translated key and do an "exclusive or" operation with the current value of D (initially zero). This corresponds to Block 13, FIG. 3. Then the instructions on lines 9100 and 9200 use the value of D (relative address) to extract a four byte word from random table (Block 14). This random word is added to H (line 9400 and Block 15). The value of J is increased by one and a test is made to determine if all the characters of the key have been operated on (line 9700 and Block 17). The number of characters in the key is the number of times the loop instructions are executed.

In terms of the functions described previously, for individual characters of the key there is an initial translation, an exclusive or operation involving the various translated characters, repeated translations, and the use of the values obtained from the exclusive or operations to select a random word. The random words obtained for each key character are all added together to obtain the single final randomized word resulting from the transformation procedure.

The instructions from lines 10300 to 11300 scale the final random word to produce a relative bin address (Block 6 of FIG. 2) in the range specified for the records of the file. Then the instructions on the lines from 11800 to 12600 store the relative bin address in the calling program and return control to the calling program. The hasher module will be called again when another key-to-address transformation is requested by any calling program.

The invention will be further illustrated by a specific, though somewhat simplistic, example. Assume that thirty records are identified by three-character keys. It has been decided that eleven bins should be used to store these records. Using the embodiment illustrated by the program of Table I, the relative bin address for a key having the value X6C would be determined in the following manner.

With the EBCDIC code the internal computer hex representation of the key is E7, F6, C3. The length of the key, $L=3$ and the number of bins is 11. These three items of information are provided to the hashing module by the calling program. Then, in algebraic terms, the values of D, H and J are set equal to zero. The hash loop will be executed three times.

The first step in the first execution of the loop is to translate the key. The decimal equivalents for the key values are 231, 246 and 195. The translation instruction extracts the (last) $L=3$ characters at these addresses in the byte table (FIG. 1) and replaces the E7, F6, C3 with 73, 43, A1. The value of L is reduced to 2. Since $J=0$, the first byte, 73, is exclusive or'ed with D. The initial value of D is also zero. Therefore the operation yields $D=73$ (decimal 115). Now the four-byte word at address 115 is extracted from the table. It has the value A2, 5B, B6, 1C. This is added to $H=0$ to yield $H=A2$, 5B, B6, 1C. As the final step in the loop the value of J is increased to 1 and status is tested. Since the loop has only been transversed once the procedure is repeated.

Now, in the second execution, $L=2$, so only the last two characters are translated and the key 73, 43, A1 (decimals 115, 67, 161) is replaced with 73, 0A, 4C. One is subtracted from L to give $L=1$. The Jth byte, 0A is exclusive or'ed with $D=73$ to yield hex 79 (decimal 121). The four bytes at address 121 are 09, D3, 5A, 21. This value is added to $H=A2$, 5B, B6, 1C to yield $H=AC$, 2F, 10, 3D. Then one is added to J to give $J=2$ and the status is tested. One more execution of the loop is required.

In the final repetition only the last ($L=1$) character is translated. The key now is 73, 0A, BF, and L is reduced to zero. Since $J=2$, the last byte BF is exclusive or'ed with $D=79$ to give hex C6 (decimal 198). This value is then used to address the random byte table and to extract the four byte word 64, 52, 60, 55. Adding this to the current value of H gives 10, 81, 70, 92. Overflows on these additions are ignored (dropped). The status test shows that this is the last execution required for the hash loop. The final value, $H=10, 81, 70, 92$, is the result of the hashing procedure.

Using the reduction (or scaling) technique given in the listing, and the value of 11 for the number of bins, the relative bin number is calculated. It's value of 0 (decimal) is the result of the key-to-address transformation and is the value passed back to the calling program. Thus the record with the key X6C will be stored in bin number 0 where the 11 bins are identified with the numbers 0, 1, 2, ... 10. The key for each of the records in the file will be transformed in the same manner. It was assumed that the file consisted of 30 records and that they would be distributed randomly through the 11 bins.

The specific embodiment of the invention described herein was adapted to IBM/360 series computers. It is obvious therefore that variations can be made in the case of other computers. For instance the byte table need not contain 256 spaces, but can have a number appropriate for the computer. The characters assigned to these spaces will also be a matter of choice. Thus in making up the random byte table values in any computer code can be assigned randomly to the spaces.

Since the combining and scaling steps are well known operations and not the essence of this invention any of those discussed can be used. Thus whereas the Boolean EXCLUSIVE OR is preferred as the mathematical operator for combining each translation with the previous translation in hash looping, any logical Boolean and/or logical arithmetic operation, such as AND, OR, addition, subtraction, and multiplication can be employed. It has already been stated that when the four-byte-word numbers are combined the resulting single number can be converted into the final address by any of the known scaling transformation methods. The only requirement is that the result must be in a range corresponding to the number of storage bins. It should be pointed out that various logical and/or mathematical operations can also be used in combining the four-byte-word numbers. Although addition is preferred, any mathematical step yielding a single number can be used.

This single number will be a random address. When the invention is used in computer storage the ultimate number is a bin or storage address. It is used to store a new document or record, and it is also used to retrieve a a record previously stored at that address. The document or record which has been retrieved may be changed by additions or deletions, or it may be merely read. If it is altered the revised record will be stored at the designated address. Apart from the computer the random number deriving process of the invention will find use in, statistics, games and the like. Since such uses and other variations will be obvious to one skilled in the art, such ramifications are deemed to be within the scope of this invention.

What is claimed is:

1. In storing and retrieving data in and from memory locations in a computer by direct addressing wherein a computer assigns data to specific external memory locations derived from data key characters, the method comprising:
    (a) storing as an array in computer memory a table of n unordered data key characters by the use of a program module, n being the number of data key characters available for the data, each data key character being randomly assigned to a distinct position in the array, each data key character having a unique position in the array,
    (b) accessing the numbered position in the array of the first data key character using its unique numerical equivalent and a calling module,
    (c) using the numerical equivalent of a new character at that numbered position in the array, translating the first data key character into still another, more random, character by a key-to-address transformation using a hashing module,
    (d) iteratively translating each data key character into new randomized characters by the use of the calling module, the hashing module, and steps (b) and (c),
    (e) selecting each new randomized character and adjacent characters in the array by an operation in the hashing module to form a composite numerical equivalent for each data key character,
    (f) combining and scaling the composite character numerical equivalents thus obtained by the use of a predetermined operation to generate a data memory address, and
    (g) storing and retrieving data in and from that data memory address by the use of the calling module.

2. Th method of claim 1 wherein the translations of record key characters are effected concomitantly, the first translation for all characters being completed before the second translations are commenced.

3. The method of claim 2 wherein the first 256 numerals of a hexadecimal numeration system are incorporated in the array.

4. The method of claim 2 wherein the number of translations for each character of the key is equal to the left-to-right position number of the character in the key, and wherein the key characters are translated sequentially in left-to-right order.

5. The method of claim 4 wherein the combining and scaling operations are addition, truncated where required, and an EXCLUSIVE OR operation.

6. The method of claim 4 wherein the combining and scaling operations include both subtraction, and the Boolean operation AND.

7. The method of claim 4 wherein the array has 128 bytes, and wherein each byte consists of 7 binary bits.

8. The method of claim 4 wherein the numerical representations are decimal values and wherein the logic operations are preformed on a decimal base.

* * * * *